United States Patent
Tang et al.

(10) Patent No.: US 11,645,122 B2
(45) Date of Patent: May 9, 2023

(54) METHOD, DEVICE, AND COMPUTER PROGRAM PRODUCT FOR MANAGING JOBS IN PROCESSING SYSTEM

(71) Applicant: EMC IP Holding Company LLC, Hopkinton, MA (US)

(72) Inventors: Jun Tang, Chengdu (CN); Yi Wang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 579 days.

(21) Appl. No.: 16/667,816

(22) Filed: Oct. 29, 2019

(65) Prior Publication Data
US 2020/0379807 A1    Dec. 3, 2020

(30) Foreign Application Priority Data
May 27, 2019   (CN) .......................... 201910446999.5

(51) Int. Cl.
*G06F 9/50*        (2006.01)
*G06N 20/00*       (2019.01)
*G06F 3/06*        (2006.01)
*G06F 9/48*        (2006.01)

(52) U.S. Cl.
CPC ............ *G06F 9/505* (2013.01); *G06F 3/0604* (2013.01); *G06F 3/0653* (2013.01); *G06F 3/0673* (2013.01); *G06F 9/4806* (2013.01); *G06N 20/00* (2019.01); *G06F 2209/5019* (2013.01); *G06F 2209/5022* (2013.01)

(58) Field of Classification Search
None
See application file for complete search history.

(56) References Cited

U.S. PATENT DOCUMENTS 3,700,866 A * 10/1972 Taylor .................... G06N 20/00
                                                                  700/47
7,941,332 B2 * 5/2011 Liu ........................ G06F 9/5083
                                                                  705/7.11

(Continued)

*Primary Examiner* — Meng Ai T An
*Assistant Examiner* — Zujia Xu
(74) *Attorney, Agent, or Firm* — Womble Bond Dickinson (US) LLP (57) ABSTRACT

The present disclosure relates to a method, device and computer program product for managing jobs in a processing system. The processing system comprises multiple client devices. In the method, based on a group of jobs from the multiple client devices, a current workload of the group of jobs is determined. A group of job descriptions associated with the group of jobs is determined based on configuration information of various jobs in the group of jobs. A future workload associated with the group of jobs is determined based on associations, comprised in a workload model, between job descriptions and future workloads associated with the job descriptions. The group of jobs in the processing system are managed based on the current workload and the future workload. With the foregoing example implementation, jobs in the processing system may be managed more effectively, and latency in processing jobs may be reduced. Further, there is provided a device and computer program product for managing jobs in a processing system.

13 Claims, 8 Drawing Sheets

(56) References Cited

U.S. PATENT DOCUMENTS

| | | | |
|---|---|---|---|
| 8,712,966 B1* | 4/2014 | Armorer | G06F 11/1464 |
| | | | 707/645 |
| 9,280,375 B1* | 3/2016 | Youseff | G06F 9/45533 |
| 2013/0227585 A1* | 8/2013 | Ichikawa | G06F 9/4881 |
| | | | 718/104 |
| 2015/0113120 A1* | 4/2015 | Jacobson | G06F 9/5088 |
| | | | 709/224 |
| 2017/0193349 A1* | 7/2017 | Jothilingam | G06N 20/20 |
| 2018/0197106 A1* | 7/2018 | Fujitani | G06N 20/00 |
| 2019/0073802 A1* | 3/2019 | Case | G06T 3/0068 |

* cited by examiner

METHOD, DEVICE, AND COMPUTER PROGRAM PRODUCT FOR MANAGING JOBS IN PROCESSING SYSTEM

CROSS-REFERENCE TO RELATED APPLICATION

This patent application claims priority, under 35 U.S.C. § 119, of Chinese Patent Application No. 201910446999.5, filed May 27, 2019, entitled "METHOD, DEVICE, AND COMPUTER PROGRAM PRODUCT FOR MANAGING JOBS IN PROCESSING SYSTEM."

FIELD

Various implementations of the present disclosure generally relate to job management, and more specifically, to a method, device and computer program product for managing jobs in a processing system.

BACKGROUND

With the development of data processing systems, they can process various jobs from client devices of users. In particular, a processing system in a cloud environment can schedule available processing resources in the processing system according to workload needs of a job to be processed currently. However, processing systems do not always process jobs in time, but latency might arise in processing systems. At this point, how to manage jobs in a processing system with higher efficiency becomes a focus of research.

SUMMARY

Therefore, it is desirable to develop and implement a technical solution for managing a processing system more effectively. It is desired that the technical solution can be compatible with an existing processing system and manage jobs in the processing system more effectively by reconstructing various configurations of the existing storage system.

According to a first aspect of the present disclosure, there is provided a method for managing jobs in a processing system, here the processing system comprises multiple client devices. In the method, based on a group of jobs from the multiple client devices, a current workload of the group of jobs is determined. A group of job descriptions associated with the group of jobs is determined based on configuration information of respective jobs in the group of jobs. A future workload associated with the group of jobs is determined based on associations, comprised in a workload model, between job descriptions and future workloads associated with the job descriptions. The group of jobs in the processing system are managed based on the current workload and the future workload.

According to a second aspect of the present disclosure, there is provided a device for managing jobs in a processing system, here the processing system comprises multiple client devices. The device comprises: at least one processor; a volatile memory; and a memory coupled to the at least one processor, the memory having instructions stored thereon, the instructions, when executed by the at least one processor, causing the apparatus to perform acts. The acts include: determining, based on a group of jobs from the multiple client devices, a current workload of the group of jobs; determining a group of job descriptions associated with the group of jobs based on configuration information of various jobs in the group of jobs; determining a future workload associated with the group of jobs based on associations, comprised in a workload model, between job descriptions and future workloads associated with the job descriptions; and managing the group of jobs in the processing system based on the current workload and the future workload.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
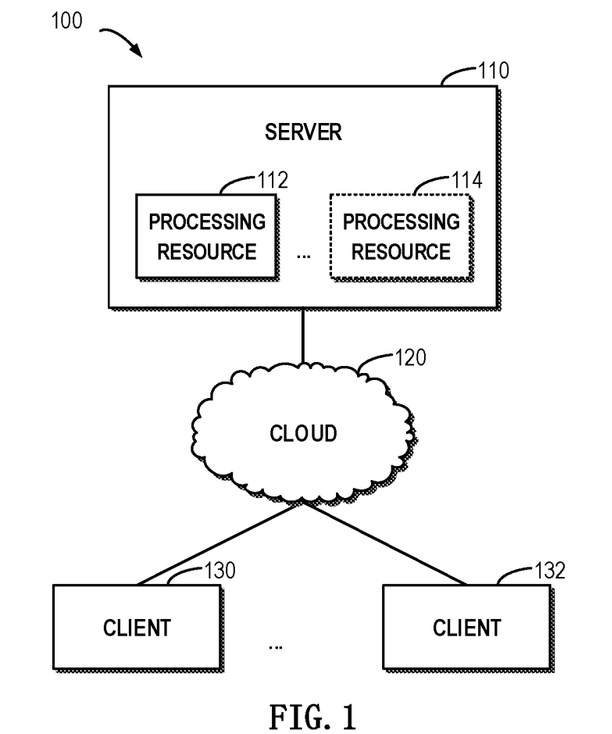
FIG. 1 illustrates a schematic view of a processing system in which example implementations of the present disclosure may be implemented.

FIG. 1 shows a schematic view of a processing system 100 in which example implementations of the present disclosure may be implemented. As depicted, the processing system 100 may be a processing system based a cloud 120. The processing system 100 may comprise a server 110 and multiple clients 130, . . . , 132. The clients 130, . . . , 132 may send one or more jobs to the server 110 via the cloud 120. The jobs here are jobs to which the server 110 needs to allocate processing resources 112, . . . , 114.

It will be understood although FIG. 1 illustrates one server 110, the processing system 100 may further involve more servers. According to example implementations of the present disclosure, the processing system 100 here may be a storage system, and the jog may be, for example, a job requesting the server 110 to perform a backup. According to example implementations of the present disclosure, the processing system 100 may further be a processing system for performing other job.

As shown in FIG. 1, the server 110 may determine the number of to-be-started processing resources 112, . . . , 114 according to a workload of a job received currently. As shown in FIG. 1, the number of processing resources usable to the server 110 is variable. Since the server 110 cannot learn in advance the workload of an incoming job but only can start more processing resources after receiving the job, latency in processing the job will be caused. On the other hand, since the server 110 has no idea of possibly incoming workloads, when there are excessive usable processing resources, the server 110 might stop some processing resources which are no longer used. At this point, if large fluctuations occur to the workload of a received job, the server 110 will constantly start/stop processing resources. Starting/stopping processing resources will cause extra overhead in the processing system 100 and further reduce the running efficiency of the processing system 100.

To solve the above drawbacks, implementations of the present disclosure provide a method, device and computer program product for managing jobs in the storage system 100. According to example implementations of the present disclosure, the concept of workload model is introduced. The workload model here comprises a job description and associations between future workloads associated with the job description. With example implementations of the present disclosure, not only a current workload may be determined based on a group of jobs received currently, but also a future possible workload may be determined based on the workload model. Further, a group of jobs may be managed in the processing system 100 based on the current workload and the future workload.

Figure 2:
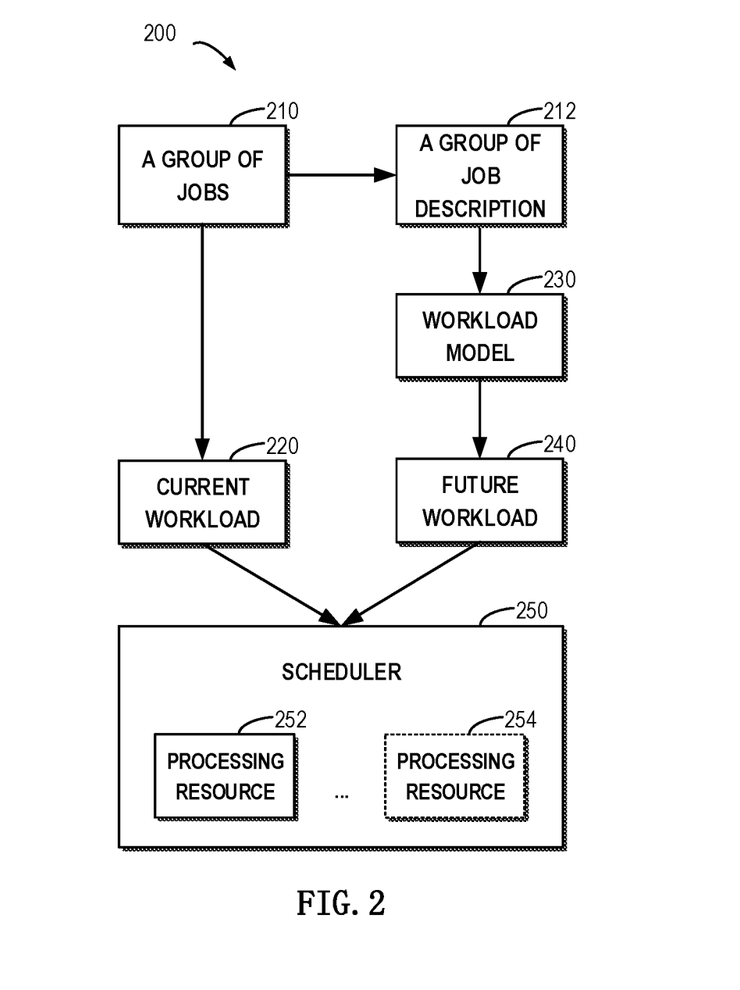
FIG. 2 schematically illustrates a block diagram of the process for managing jobs in a processing system according to example implementations of the present disclosure.

With reference to FIG. 2, description is presented below to more details about the present disclosure. FIG. 2 schematically shows a block diagram 200 of the process for managing jobs in the processing system 100 according to example implementations of the present disclosure. As depicted, a current workload produced by a group of jobs 210 from multiple client devices may be determined based on the group of jobs 210. Here the current workload refers to a workload resulting from performing the group of jobs 210. A group of job descriptions 212 associated with the group of jobs 210 may further be determined based on configuration information of each job in the group of jobs 210. Here each job description in the group of job descriptions 212 may correspond to each job in the group of jobs 210.

By inputting the group of job descriptions 212 to a pre-obtained workload model 230, a future workload 240 associated with the group of jobs 210 may be determined based on an association, comprised in the workload model 230, between a job description and a future workload associated with the job description. Here, the future workload 240 refers to a workload that may possible occur in the processing system 100 within a future time period.

It will be understood usually jobs in the processing system 100 may have associations between them. For example, jobs of another type might follow jobs of some types; for example, a job trough might arise after jobs of some types; for another example, some jobs might be started in a predetermined time. All of these will cause changes of workloads in a future time period after the processing system 100 receives some jobs. Here the job model 230 describes an association between the job description and the future workload.

With example implementations of the present disclosure, the group of jobs 210 in the processing system 100 may be managed more effectively based on a current workload 220 and the future workload 240. Further, as shown in FIG. 2, based on the current workload 220 and the future workload 240, a scheduler 250 of the processing system 100 may determine in view of workloads how many processing resources are needed to perform various jobs, and further may schedule processing resources 252, . . . , 254 in the processing system 100 more effectively.

Figure 3:
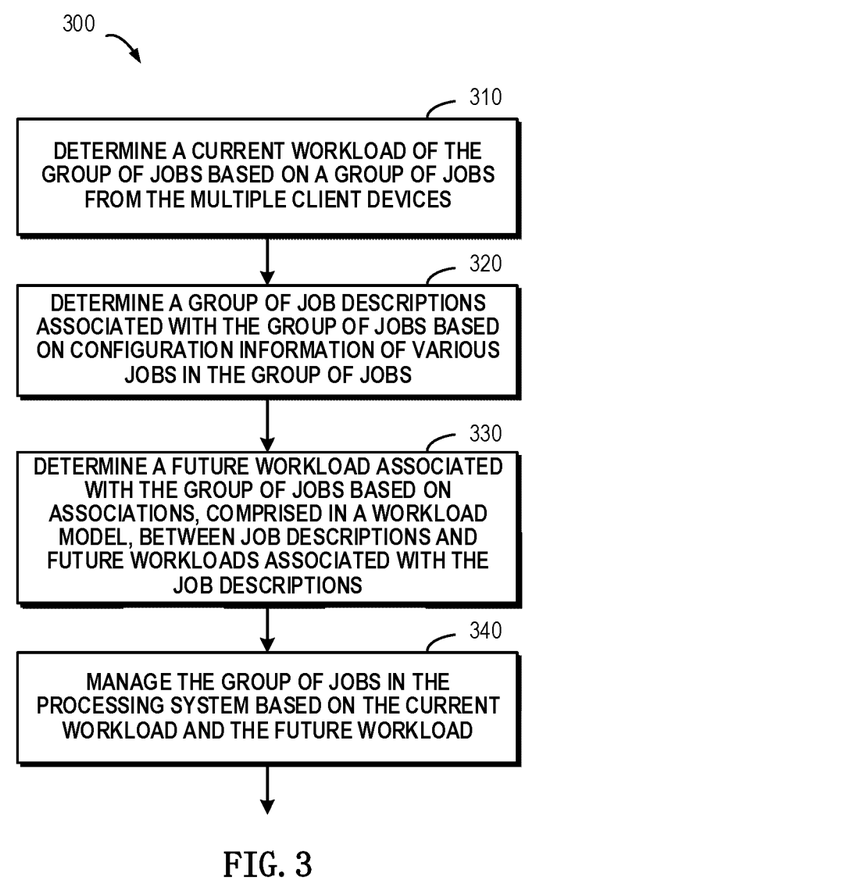
FIG. 3 schematically illustrates a flowchart of a method for managing jobs in a processing system according to example implementations of the present disclosure.

With reference to FIG. 3, description is presented below to more details on how to manage jobs in the processing system 100. FIG. 3 schematically shows a flowchart of a method 300 for managing jobs in the processing system 100 according to example implementations of the present disclosure. At block 310, a current workload of a group of jobs 210 from multiple client devices may be determined based on the group of jobs 210. For example, a portion associated with each job in a current workload 220 may be determined based on the type of each job in the group of jobs 210, the data amount involved in the job and other factors. Subsequently, the current workload 220 of the group of jobs 210 may be obtained by adding up various portions.

To clearly describe example implementations of the present disclosure, a storage system is cited as a specific example of the processing system 100 by way of description. According to example implementations of the present disclosure, the method 300 may be implemented at a backup server of the storage system. Here the backup server may receive backup jobs from various clients and perform backup operations specified in these jobs. Here a job in the group of jobs 210 is a backup job for performing a data backup in the storage system.

It will be understood typically jobs in the processing system 100 come from two aspects: policy group configuration of the processing system 100 and jobs periodically performed in the processing system 100. Therefore, the group of jobs 210 may be obtained based on the two aspects. In the storage system, the policy group configuration is responsible for triggering most backup jobs, so backup jobs from various clients may be obtained from the policy group configuration. On the other hand, there further exist some jobs periodically running in the storage system. For example, a backup rule may define data is to be backed up every night. Therefore, jobs performed periodically may further be obtained. In this way, all types of jobs in the backup system may be obtained, and further the current workload 220 may be determined more accurately.

At block 320, a group of job descriptions associated with the group of jobs 210 may be determined based on configuration information of various jobs in the group of jobs 210. According to example implementations of the present disclosure, a corresponding job description in the group of job descriptions 212 may be determined with respect to each job in the group of jobs 210. Specifically, a group of attributes of a job may be extracted from the configuration information. Here the attributes may comprise at least one of: type of the job, interval of the job, starting time of the job, ending time of the job, as well as stream configuration of the job. Subsequently, a job description of the job may be generated based on the group of attributes. More details about attributes will be described in detail with reference to FIG. 4 below.

Figure 4:
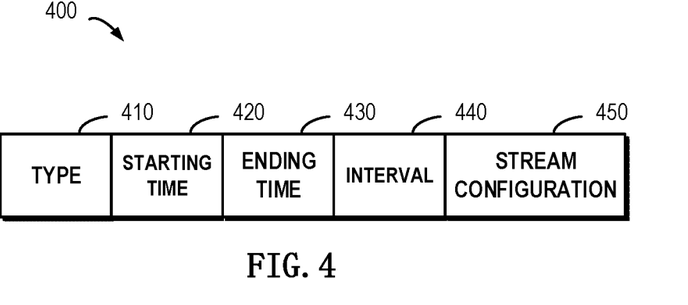
FIG. 4 schematically illustrates a block diagram of attributes of a job according to example implementations of the present disclosure.

FIG. 4 schematically shows a block diagram 400 of attributes of a job according to example implementations of the present disclosure. As depicted, a type 410 may represent the type of a job. For example, regarding a backup job, the type 410 may comprise backup job of a file system, backup job of a database, backup job of a virtual machine, etc. A starting time 420 may represent the time when the execution the backup job is started, and an ending time 430 may represent the time when the execution of the backup job is ended. For example, the starting time 420 and the ending time 430 may be represented as time in the day. An interval 440 may represent, for example, an interval time between the job and a next job. Stream configuration 450 may represent the number of streams associated with the execution of a backup job inside the backup system.

It will be understood FIG. 4 merely illustrates multiple examples of possible attributes, and job attributes may comprise more or less depending on different application environments. It will be understood regarding a certain job, a workload for processing the job depends on multiple attributes of the job. Therefore, with example implementations of the present disclosure, a job description is generated based on the group of attributes of the job, so that a workload the job will produce in future can be determined more accurately. A corresponding job description may be generated for each job. For example, a vectorized representation comprising five attributes as shown in FIG. 4 may be used to generate the job description. At this point, the job description of each job may be represented as a five-dimensional vector. When a job involves more or less attributes, dimensions of the vector may be determined based on the number of attributes.

At block 330, a future workload 240 associated with the group of jobs 210 may be determined based on an association comprised in the workload model 230 between a job description and a future workload associated with the job description. The workload model 230 here is a knowledge model which is built based on historical data collected in the processing system 100 to represent an association between a job description and a future workload. According to example implementations of the present disclosure, multiple historical workloads associated with various historical jobs among multiple historical jobs may be obtained. It will be understood each historical job will produce a certain historical workload in the processing system 100. The workload model 230 may be trained using multiple historical jobs and multiple historical workloads, so that the workload model 230 may describe associations between historical jobs and historical workloads. More details on how to build the workload model will be described with reference to FIG. 5 below.

Figure 5:
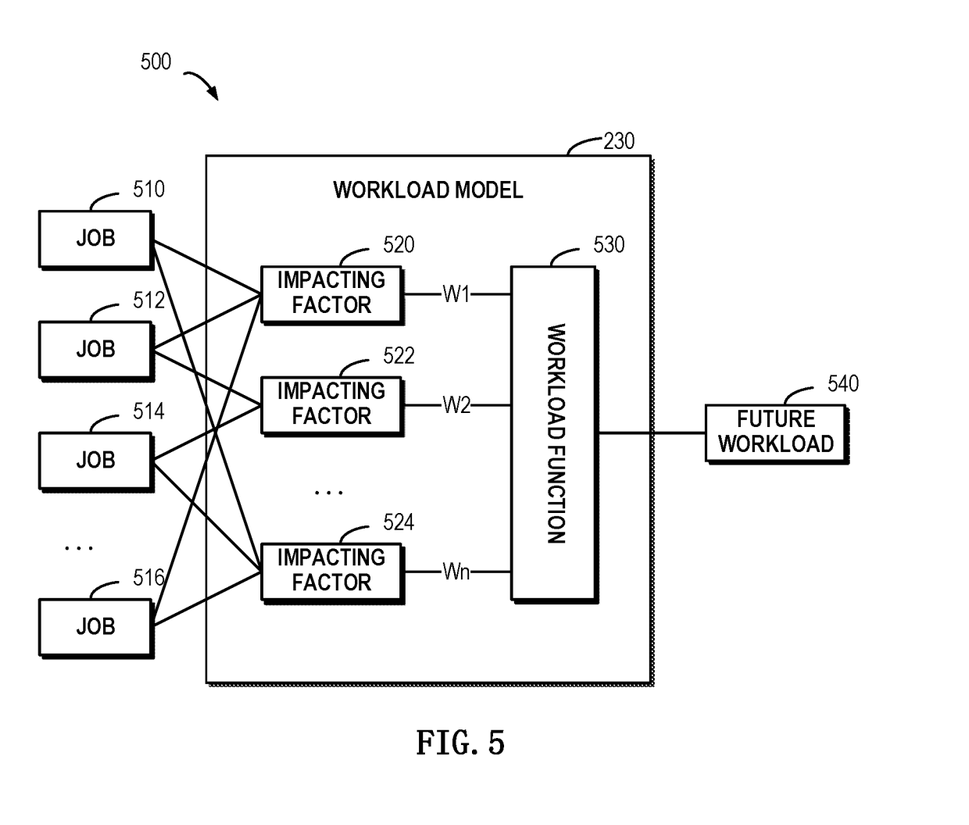
FIG. 5 schematically illustrates a block diagram of the process for building a workload model according to example implementations of the present disclosure.

FIG. 5 schematically shows a block diagram 500 of the process for building the workload model 230 according to example implementations of the present disclosure. As depicted, jobs 510, 512, 514, . . . , 516 represent multiple historical jobs obtained from the processing system 100. For example, various attributes of each historical job and a corresponding historical workload may be stored as Table 1 below.

TABLE 1

| | | | | | | |
|---|---|---|---|---|---|---|
| Historical Jobs | | | | | | |
| Job ID | Type | Starting Time | Ending Time | Interval | Stream Configuration | Historical Workload |
| 510 | | | | | | |
| 512 | | | | | | |
| 514 | | | | | | |
| . . . | . . . | . . . | . . . | . . . | . . . | . . . |
| 516 | | | | | | |

In Table 1, the first column "Job ID" represents an identifier of each historical job, the following five columns represent relevant attributes of a job, and the last column "historical workload" represents a historical workload caused by a historical job. It will be understood the historical workload here refers to a workload in the processing system 100 for a time after receiving a historical job, rather than a workload caused by executing the historical job.

Each historical job may be stored as a vector. As shown in Table 1, each row in the table represents one historical job. According to example implementations of the present disclosure, multiple impacting factors 520, 522, . . . , and 524 may be set. Each impacting factor may represent an impact of a corresponding attribute on the workload model 230, and a corresponding weight may be set for each impacting factor. For example, a weight W1 may be set for the impacting factor 520, W2 may be set for 522, . . . , and Wn may be set for 524.

A workload function 530 may be constructed based on machine learning technology. It is desired the workload function 530 may describe associations between the multiple jobs 510, 512, 514, . . . , 516 and corresponding future workloads 540. After the workload model 230 is trained based on historical sample data, when the jobs 510, 512, 514, . . . , 516 and inputted to the workload model 230, the future workloads 540 determined by the workload model 230 is consistent as much as possible with corresponding historical workloads collected in the processing system 100.

For example, suppose Formula 1 and Formula 2 represent impacting factors (wherein $x_i$ represents the $i^{th}$ impacting factor) and corresponding weights (wherein $w_i$ represents a weight of the $i^{th}$ impacting factor) respectively, wherein the integer m represents the number of impacting factors. At this point, the vector $X^T$ represents a group of impacting factors, and the vector $W^T$ represents corresponding weights.

$$X^T = [x_1 x_2 \ldots x_m] \qquad \text{Formula 1}$$

$$W^T = [w_1 w_2 \ldots w_m] \qquad \text{Formula 2}$$

The workload function 530 may be represented as Formula 3 below, wherein z represents a workload function, and b represents a constant.

$$z = b + w_1 \times x_1 + w_2 \times x_2 + \ldots + w_m \times x_m = b + \Sigma_{k=1}^{m} w_k \times x_k \qquad \text{Formula 3}$$

A Sigmoid function as shown in Formula 4 below may be used as an activation function of the workload model 230.

Regarding the $i^{th}$ impacting factor among impacting factors, Formula 5 may be obtained as below.

$$f(z) = \frac{1}{1+e^{-z}} = \frac{1}{1+e^{(-b-\sum_{k=1}^{m} w_k \times x_k)}} \quad \text{Formula 4}$$

$$f(z(i)) = \frac{1}{1+e^{-z(i)}} = \frac{1}{1+e^{(-b-\sum_{k=1}^{m} w_k(i) \times x_k(i))}} \quad \text{Formula 5}$$

Formula 6 may be used to represent differences between historical workloads in collected historical sample data and future workloads determined based on the workload model 230, and further a cost function may be constructed as shown by Formula 7.

$$e(z(i)) = d(z(i)) - f(z(i)) \quad \text{Formula 6}$$

$$E(W) = \tfrac{1}{2} \Sigma_{i=1}^{N} e^2(z(i)) = \tfrac{1}{2} \Sigma_{i=1}^{N} (d(z(i)) - f(z(i)))^2 \quad \text{Formula 7}$$

By deriving Formula 7, Formula 8 may be obtained as below.

$$g = \frac{\partial E(W)}{\partial W} = \frac{\partial}{\partial W}\left(\frac{1}{2}\sum_{i=1}^{N}(d(z(i)) - f(z(i)))^2\right) = \quad \text{Formula 8}$$

$$-\sum_{i=1}^{N} e(z(i)) f(z(i))(1 - f(z(i)))$$

Based on the partial derivatives, the step length n may be set, and a value for next training may be obtained based on Formula 9

$$W(i+1) = W(i) - ng(i) = W(i) + n\Sigma_{i=1}^{N} e(z(i)) f(z(i))(1 - f(z(i))) \quad \text{Formula 9}$$

The workload model 230 may be iteratively trained based on the above formulas by using collected historical sample data, until the cost function E(W) satisfies a predetermined condition. It will be understood a brief description has been presented to principles involved in training the workload model 230 with reference to Formulas 1 to 9. In the context of the present disclosure, it is not intended to limit in which way the workload model 230 is trained, but the workload model 230 may be obtained based on multiple training techniques which have been already developed and/or are to be developed in future.

Figure 6:
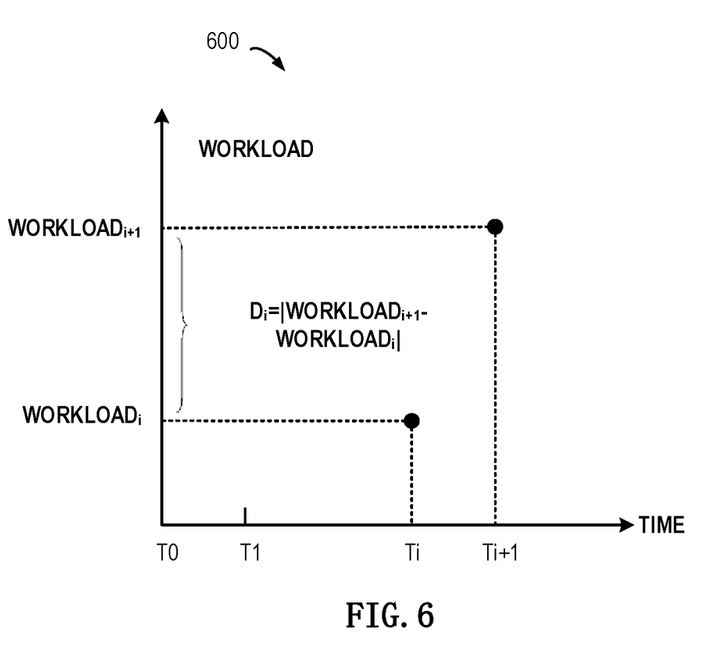
FIG. 6 schematically illustrates a block diagram of the process for selecting historical data according to example implementations of the present disclosure.

According to example implementations of the present disclosure, in order to reduce fluctuations that might occur when the workload model 230 predicts the future workload 240, preferably sample data associated with small fluctuations may be selected. For example, suppose values of the obtained multiple historical workloads are represented as [$V_1, V_2, \ldots V_N$] (here N is an integer representing the number of historical samples). Historical data with large workload fluctuations may be filtered based on the difference between two successive workload values. With reference to FIG. 6, description is presented below to how to select historical data for training based on the difference between two workload values.

FIG. 6 schematically shows a block diagram 600 of the process for selecting historical data according to example implementations of the present disclosure. As depicted, the abscissa represents time, wherein various time points represent time points when historical workloads are collected in the processing system 100. The ordinate represents values of historical workloads collected in the processing system 100. Regarding time points Ti and Ti+1, corresponding workloads are workloads i and i+1 respectively, so a workload amplitude difference associated with each time point may be determined based on Formula 10.

$$D_i = |V_{i+1} - V_i| \quad \text{Formula 10}$$

In Formula 10, $D_i$ represents the workload amplitude difference associated with the $i^{th}$ time point, $V_{i+1}$ and $V_i$ represent values of historical workloads obtained at the time points i+1 and i respectively. According to example implementations of the present disclosure, an average value of differences between every two successive workloads among multiple historical workloads may be determined. For example, an average value $D_{avg}$ of differences between two successive historical workloads may be determined based on Formula 11 below.

$$D_{avg} = \frac{1}{N-1}\sum_{i=1}^{N-1} D_i = \frac{1}{N-1}\sum_{i=1}^{N-1}(|V_{i+1} - V_i|) \quad \text{Formula 11}$$

In Formula 11, N represents the number of historical workloads, $D_i$ represents the difference between the $i^{th}$ historical workload and the subsequent $i+1^{th}$ historical workload. According to example implementations of the present disclosure, the difference between a pair of successive historical workloads in the group of workloads is determined, and then the difference is compared with the average value to determine whether to select corresponding historical data.

According to example implementations of the present disclosure, if the difference is below the average value, then historical jobs associated with the pair of historical workloads may be selected. In other words, if $D_i \leq D_{avg}$, then the workload model 230 is trained using historical data related to the pair of historical workloads. Further, historical data that leads to a large workload difference may be removed, and the average value determined based on Formula 11 may be compared with the difference $D_i$ at each historical workload. If $D_i > D_{avg}$, then historical data related to the historical workload is not used to train the workload model 230.

In this way, historical data that leads to a large workload difference may be removed from training data. By training the workload model 230 with historical data that leads to gradual workload changes, the obtained workload model 230 can reflect gradual changes between the job and the future workload. Therefore, it may be ensured when the workload model 230 performs prediction, the obtained future workload will not fluctuate sharply. Further, it may be ensured the processing system 100 will not repeatedly start new processing resources and stop existing processing resources, and also the overall performance of the processing system 100 may be improved.

Returning to FIG. 3, at block 340, the group of jobs 210 may be managed based on the current workload and the future workload. According to example implementations of the present disclosure, a threshold of workloads (referred to as threshold workload) which may be processed by a group of processing resources started in the processing system 100 may be determined first. It will be understood the threshold workload here refers to a workload which the group of started processing resources can process additionally. The higher the threshold workload, the stronger the available processing capability of the processing system 100.

According to example implementations of the present disclosure, the threshold workload may be compared with the future workload 240. If it is determined the threshold workload is below the future workload 240, this means the extra processing capability of processing resources started in the processing system 100 at this point is not enough to process a workload that is incoming in a time period, so more processing resources need to be started. With example implementations of the present disclosure, processing resources may be started in advance in the processing system 100, so potential latency which might be caused when a future job comes may be avoided.

According to example implementations of the present disclosure, the processing resources may comprise two types, i.e. master processing resources and slave processing resources. Here the master processing resource refers to a processing resource that is always in a started state in the processing system 100. The master processing resource runs all the time regardless of a workload in the processing system 100. On the one hand, the master processing resource may be used to process jobs from various clients, and on the other hand, the master processing resource may further coordinate relationships among various slave processing resources in the processing system 100 so as to jointly process jobs in the processing system 100. According to example implementations of the present disclosure, it may be considered whether the spare processing capability of the processing system 100 may deal with the current workload 220.

According to example implementations of the present disclosure, if it is determined the threshold workload is below the current workload 220, then at least one processing resource may be started for processing at least one portion of the group of jobs. With the above example implementations, the shortage of available processing resources in the processing system 100 may be alleviated.

According to example implementations of the present disclosure, when the workload in the processing system 100 reduces, started processing resources are not stopped immediately, but a potential workload that might come in future is considered. Specifically, the available processing capability in the processing system 100 may be compared with the future workload; if the available processing capability is enough to process an incoming workload in future, then a portion of slave processing resources in the group of that have been started processing resources may be stopped. In other words, one or more slave processing resources may be stopped only when the threshold workload is above both the current workload 220 and the future workload 240.

Figure 7:
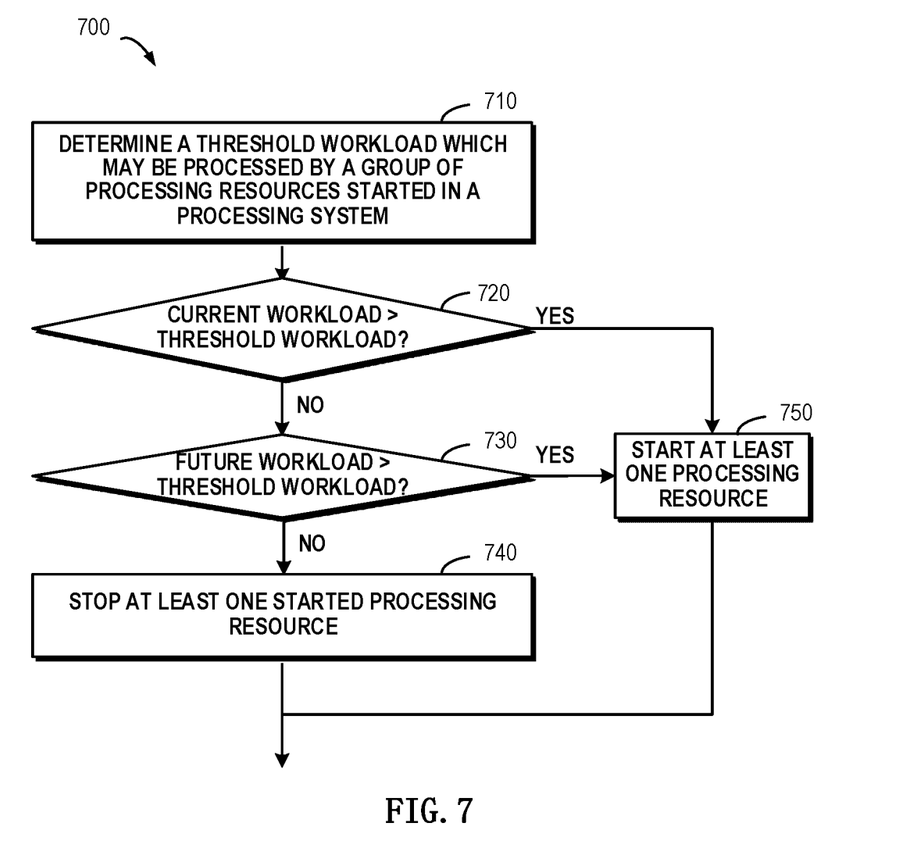
FIG. 7 schematically illustrates a flowchart of a method for starting/stopping processing resources according to example implementations of the present disclosure.

With reference to FIG. 7, description is presented below to more details on how to start/stop processing resources. FIG. 7 schematically shows a flowchart of a method 700 for starting/stopping processing resources according to example implementations of the present disclosure. As depicted, at block 710, a threshold workload which may be processed by a group of processing resources started in the processing system 100 may be determined. According to example implementations of the present disclosure, the number of processing resources to be started/stopped may be determined according to a difference between the threshold workload and the current workload 220/future workload 230. The threshold workload, current workload and future workload may be described in an integral multiple of the processing capability of one processing resource.

At block 720 in FIG. 7, the current workload 220 may be compared with the threshold workload. If the current workload 220 is larger than the threshold workload, then the method 700 proceeds to block 750 so as to start at least one processing resource. For example, suppose the threshold workload is 5 and the current workload is 6, then 6−5=1 processing resource needs to be started. If the comparison result at block 720 is "No," then the method 700 proceeds to block 730 so as to compare the future workload 240 with the threshold workload. If the judgment result at block 730 is "Yes," then the method 700 proceeds to block 750 where the number of processing resources to be started may be determined based on the difference between the future workload 240 and the threshold workload. Suppose the threshold workload is 5 and the future workload is 6, then 6−5=1 processing resource needs to be started.

It will be understood when there is a surplus of available processing capability in the processing system 100, one or more processing resources may be stopped. As shown at block 730 in FIG. 7, if the future workload is below the threshold workload, then the method 700 proceeds to block 740, and at this point one or more started processing resources may be stopped. The number of processing resources to be stopped may be determined based on the difference between the future workload 240 and the threshold workload. For example, if the threshold workload is 5, the current workload is 3 and the future workload is 4, then 5−4=1 processing resource may be stopped. For another example, if the threshold workload is 5, the current workload is 3 and the future workload is 5, then no processing resource will be stopped, but processing resources started currently may be used to process a potential workload that might come in future. In this way, extra overhead caused by repeatedly starting and stopping processing resources in the processing system 100 may be avoided, and further the overall performance of the processing system 100 may be improved.

While examples of the method according to the present disclosure have been described in detail with reference to FIGS. 2 to 7, description is presented below to the implementation of a corresponding apparatus. According to example implementations of the present disclosure, provided is an apparatus for managing jobs in a processing system, the processing system comprising multiple client devices. The apparatus comprises: a current workload determining module configured to determine, based on a group of jobs from the multiple client devices, a current workload of the group of jobs; a job description determining module configured to determine a group of job descriptions associated with the group of jobs based on configuration information of various jobs in the group of jobs; a future workload determining module configured to determine a future workload associated with the group of jobs based on associations, comprised in a workload model, between job descriptions and future workloads associated with the job descriptions; and a managing module configured to manage the group of jobs in the processing system based on the current workload and the future workload.

According to example implementations of the present disclosure, the job description determining module comprises: an attribute module configured to, with respect to a job in the group of jobs, extract a group of attributes of the job from the configuration information, the group of attributes comprising at least one of: type of the job, interval of the job, starting time of the job, ending time of the job, and stream configuration of the job; and a generating module configured to generate a job description of the job based on the group of attributes.

According to example implementations of the present disclosure, the managing module comprises: a threshold workload determining module configured to determine a threshold workload of jobs which may be processed by a group of processing resources started in the processing system; a starting module configured to, in response to determining the threshold workload is below the future workload, start at least one processing resource in the processing system for processing at least one portion of the group of jobs.

According to example implementations of the present disclosure, the starting module is further configured to: in response to determining the threshold workload is below the current workload, start at least one processing resource in the processing system for processing at least one portion of the group of jobs.

According to example implementations of the present disclosure, further comprised is: a stopping module configured to, in response to determining the threshold workload is above the current workload and the threshold workload is above the future workload, stop at least one processing resource in the group of processing resources that have been started in the processing system.

According to example implementations of the present disclosure, further comprised is a model obtaining module configured to obtain the workload model. The model obtaining module comprises: a historical job obtaining module configured to obtain multiple historical jobs of the processing system; a historical workload obtaining module configured to obtain multiple historical workloads associated with respective historical jobs among the multiple historical jobs, respectively; and a training module configured to, based on the multiple historical jobs and the multiple historical workloads, train the workload model so that the workload model represents associations between historical jobs and historical workloads.

According to example implementations of the present disclosure, further comprised are: an average value module configured to determine an average value of differences between two successive workloads among the multiple historical workloads; a difference module configured to determine a difference between two successive historical workloads in the group of workloads; and a selecting module configured to, in response to the difference being below the average value, train the workload model by using the two historical workloads and one or more historical jobs associated with the two historical workloads.

According to example implementations of the present disclosure, the group of jobs are obtained from at least one of: policy group configuration of the processing system; and periodic policies of the processing system.

According to example implementations of the present disclosure, the apparatus is implemented at a backup server of the processing system, and a job in the group of jobs is a backup job for performing a data backup.

According to example implementations of the present disclosure, the processing resource is a backup instance for performing the backup job.

Figure 8:
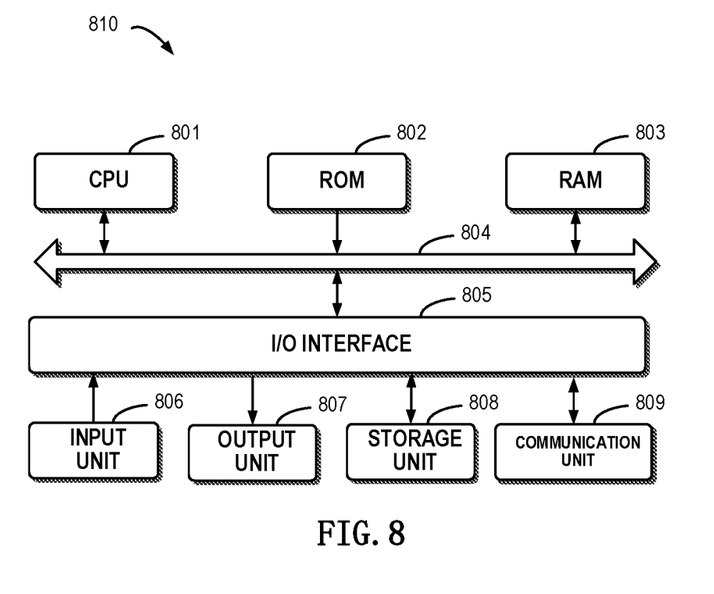
FIG. 8 schematically illustrates a block diagram of a device for managing jobs in a processing system according to example implementations of the present disclosure.

FIG. 8 schematically shows a block diagram of a device 800 for managing a storage system according to example implementations of the present disclosure. As depicted, the device 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the apparatus 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the device 800 to exchange information/data with other devices via the computer network, such as Internet, and/or various telecommunication networks.

The above described each process and treatment, such as the methods 300 and 700 can also be executed by the processing unit 901. For example, in some implementations, the methods 300 and 700 can be implemented as a computer software program tangibly included in the machine-readable medium, e.g., the storage unit 808. In some implementations, the computer program can be partially or fully loaded and/or mounted to the device 800 via ROM 802 and/or the communication unit 809. When the computer program is loaded to the RAM 803 and executed by the CPU 801, one or more steps of the above described methods 300 and 700 can be implemented. Alternatively, in other implementations, the CPU 801 also can be configured in other suitable manners to realize the above procedure/method.

According to example implementations of the present disclosure, there is provided a device for managing jobs in a processing system, here the processing system comprises multiple client devices. The device comprises: at least one processor; a volatile memory; and a memory coupled to the at least one processor, the memory having instructions stored thereon, the instructions, when executed by the at least one processor, causing the apparatus to perform acts. The acts include: determining, based on a group of jobs from the multiple client devices, a current workload of the group of jobs; determining a group of job descriptions associated with the group of jobs based on configuration information of various jobs in the group of jobs; determining a future workload associated with the group of jobs based on associations comprised in a workload model between job descriptions and future workloads associated with the job descriptions; and managing the group of jobs in the processing system based on the current workload and the future workload.

According to example implementations of the present disclosure, determining a group of job descriptions associated with the group of jobs based on configuration information of various jobs in the group of jobs comprises: with respect to a job in the group of jobs, extracting a group of attributes of the job from the configuration information, the group of attributes comprising at least one of: type of the job, interval of the job, starting time of the job, ending time of the job, and stream configuration of the job; and generating a job description of the job based on the group of attributes.

According to example implementations of the present disclosure, managing the group of jobs in the processing system based on the current workload and the future workload comprises: determining a threshold workload of jobs which may be processed by a group of processing resources started in the processing system; in response to determining the threshold workload being below the future workload, starting at least one processing resource in the processing system for processing at least one portion of the group of jobs.

According to example implementations of the present disclosure, the acts further comprise: in response to determining the threshold workload being below the current workload, starting at least one processing resource in the processing system for processing at least one portion of the group of jobs.

According to example implementations of the present disclosure, the acts further comprise: in response to determining the threshold workload being above the current workload and the threshold workload is above the future workload, stopping at least one processing resource in the group of processing resources that have been started in the processing system.

According to example implementations of the present disclosure, the acts further comprise: obtaining the workload model, comprising: obtaining multiple historical jobs of the processing system, respectively; obtaining multiple historical workloads associated with respective historical jobs among the multiple historical jobs, respectively; and training the workload model based on the multiple historical jobs and the multiple historical workloads, so that the workload model represents associations between historical jobs and historical workloads.

According to example implementations of the present disclosure, the acts further comprise: determining an average value of differences between two successive workloads among the multiple historical workloads; determining a difference between two successive historical workloads in the group of workloads; and in response to the difference being below the average value, training the workload model by using the two historical workloads and one or more historical jobs associated with the two historical workloads.

According to example implementations of the present disclosure, the acts further comprise: obtaining the group of jobs from at least one of: policy group configuration of the processing system; and periodic policies of the processing system.

According to example implementations of the present disclosure, the device is implemented at a backup server of the processing system, a job in the group of jobs is a backup job for performing a data backup, and the processing resource is a backup instance for performing the backup job.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing jobs in a processing system, the processing system comprising multiple client devices, the method comprising:
   determining, based on a group of jobs from the multiple client devices, a current workload of the group of jobs;
   determining a group of job descriptions associated with the group of jobs based on configuration information of respective jobs in the group of jobs;
   obtaining a workload model;
   determining a future workload associated with the group of jobs based on associations, comprised in the workload model, between job descriptions and future workloads associated with the job descriptions; and
   managing the group of jobs in the processing system based on the current workload and the future workload,
   wherein obtaining the workload model comprises:
      obtaining multiple historical jobs of the processing system, respectively;
      obtaining multiple historical workloads associated with respective historical jobs among the multiple historical jobs, respectively; and
      training, by a hardware processor, the workload model based on the multiple historical jobs and the multiple historical workloads, so that the workload model represents the associations between the multiple historical jobs and the multiple historical workloads,
   wherein training the workload model comprises:
      determining an average value of differences between every pair of successive historical workloads among the multiple historical workloads;
      determining a difference between a first historical workload and a second historical workload of one of the pairs of successive historical workloads in the multiple historical workloads;
      in response to the difference between the first historical workload and the second historical workload being below the average value, training the workload model by using the first and second historical workloads and one or more historical jobs associated with the first and second historical workloads; and
      in response to the difference being above the average value, omitting the first and second historical workloads from being used to train the workload model, and
   wherein managing the group of jobs comprises:
      determining a threshold workload of jobs which are processable by a group of processing resources started in the processing system; and
      in response to determining the threshold workload being below at least one of the current or the future workload, starting at least one processing resource in the processing system for processing at least one portion of the group of jobs.

2. The method of claim 1, wherein determining the group of job descriptions associated with the group of jobs based on the configuration information of the respective jobs in the group of jobs comprises: with respect to a job in the group of jobs,
   extracting a group of attributes of the job from the configuration information, the group of attributes comprising at least one of: type of the job, interval of the job, starting time of the job, ending time of the job, and stream configuration of the job; and
   generating a job description of the job based on the group of attributes.

3. The method of claim 2, wherein the method is performed at a backup server of the processing system, and the job in the group of jobs is a backup job for performing a data backup, and
   wherein the group of attributes comprises the stream configuration representing a number of streams associated with an execution of the backup job inside the backup server.

4. The method of claim 1, further comprising:
   in response to determining the threshold workload being above the current workload and the threshold workload being above the future workload, stopping the at least one processing resource in the group of processing resources that have been started in the processing system.

5. The method of claim 1, further comprising obtaining the group of jobs from at least one of:

policy group configuration of the processing system; or periodic policies of the processing system.

6. The method of claim 1, wherein the at least one processing resource is a backup instance for performing a backup job.

7. A device for managing jobs in a processing system, the processing system comprising multiple client devices, comprising:
 at least one hardware processor;
 a volatile memory; and
 a memory coupled to the at least one hardware processor and having instructions stored thereon, the instructions, when executed by the at least one hardware processor, causing the device to perform operations comprising:
 determining, based on a group of jobs from the multiple client devices, a current workload of the group of jobs;
 determining a group of job descriptions associated with the group of jobs based on configuration information of various jobs in the group of jobs;
 obtaining a workload model;
 determining a future workload associated with the group of jobs based on associations, comprised in the workload model, between job descriptions and future workloads associated with the job descriptions; and
 managing the group of jobs in the processing system based on the current workload and the future workload,
 wherein obtaining the workload model comprises:
  obtaining multiple historical jobs of the processing system, respectively;
  obtaining multiple historical workloads associated with respective historical jobs among the multiple historical jobs, respectively; and
  training the workload model based on the multiple historical jobs and the multiple historical workloads, so that the workload model represents the associations between the multiple historical jobs and the multiple historical workloads,
 wherein training the workload model comprises:
  determining an average value of differences between every pair of successive historical workloads among the multiple historical workloads;
  determining a difference between a first historical workload and a second historical workload of one of the pairs of successive historical workloads in the multiple historical workloads;
  in response to the difference between the first historical workload and the second historical workload being below the average value, training the workload model by using the first and second historical workloads and one or more historical jobs associated with the first and second historical workloads; and
  in response to the difference being above the average value, omitting the first and second historical workloads from being used to train the workload model, and
 wherein managing the group of jobs comprises:
  determining a threshold workload of jobs which are processable by a group of processing resources started in the processing system; and
  in response to determining the threshold workload being below at least one of the current or the future workload, starting at least one processing resource in the processing system for processing at least one portion of the group of jobs.

8. The device of claim 7, wherein determining the group of job descriptions associated with the group of jobs based on the configuration information of the respective jobs in the group of jobs comprises: with respect to a job in the group of jobs,
 extracting a group of attributes of the job from the configuration information, the group of attributes comprising at least one of: type of the job, interval of the job, starting time of the job, ending time of the job, and stream configuration of the job; and
 generating a job description of the job based on the group of attributes.

9. The device of claim 8, wherein the device is a backup server of the processing system, the job in the group of jobs is a backup job for performing a data backup, and
 wherein the group of attributes comprises the stream configuration representing a number of streams associated with an execution of the backup job inside the backup server.

10. The device of claim 7, wherein the operations further comprise:
 in response to determining the threshold workload being above the current workload and the threshold workload being above the future workload, stopping at least one processing resource in the group of processing resources that have been started in the processing system.

11. The device of claim 7, wherein the group of jobs are obtained from at least one of:
 policy group configuration of the processing system; or
 periodic policies of the processing system.

12. A computer program product, tangibly stored on a non-transient computer readable medium and comprising machine executable instructions which are used to perform operations for managing jobs in a processing system, the operations comprising:
 determining, based on a group of jobs from multiple client devices, a current workload of the group of jobs;
 determining a group of job descriptions associated with the group of jobs based on configuration information of respective jobs in the group of jobs;
 obtaining a workload model;
 determining a future workload associated with the group of jobs based on associations, comprised in the workload model, between job descriptions and future workloads associated with the job descriptions; and
 managing the group of jobs based on the current workload and the future workload,
 wherein obtaining the workload model comprises:
  obtaining multiple historical jobs;
  obtaining multiple historical workloads associated with respective historical jobs among the multiple historical jobs, respectively; and
  training, by a hardware processor, the workload model based on the multiple historical jobs and the multiple historical workloads, so that the workload model represents the associations between the multiple historical jobs and the multiple historical workloads,
 wherein training the workload model comprises:
  determining an average value of differences between every pair of successive historical workloads among the multiple historical workloads;
  determining a difference between a first historical workload and a second historical workload of one of the pairs of successive historical workloads in the multiple historical workloads;
  in response to the difference between the first historical workload and the second historical workload being below the average value, training the workload model by using the first and second historical workloads and one or more historical jobs associated with the first and second historical workloads; and in response to the difference being above the average value, omitting the first and second historical workloads from being used to train the workload model, and wherein managing the group of jobs comprises:

determining a threshold workload of jobs which are processable by a group of processing resources started in the processing system; and in response to determining the threshold workload being below at least one of the current or the future workload, starting at least one processing resource in the processing system for processing at least one portion of the group of jobs.

13. The computer program product of claim 12, wherein a job in the group of jobs is a backup job for performing a data backup, and wherein determining a group of job descriptions associated with the group of jobs based on the configuration information of the respective jobs in the group of jobs comprises: with respect to the job in the group of jobs, extracting a group of attributes of the job from the configuration information, the group of attributes comprising a stream configuration of the job representing a number of streams associated with an execution of the backup job; and generating a job description of the job based on the group of attributes.

* * * * *